S. C. Blodgett,
Table Fork.
Nº 14,275.    Patented Feb. 19, 1856.

Witnesses.
J. E. Shaw
J. H. B. Jenkins

Inventor.
Sherburne C. Blodgett

UNITED STATES PATENT OFFICE.

SHERBURNE C. BLODGETT, OF PHILADELPHIA, PENNSYLVANIA.

FORK.

Specification of Letters Patent No. 14,275, dated February 19, 1856.

*To all whom it may concern:*

Be it known that I, SHERBURNE C. BLODGETT, of the city of Philadelphia and State of Pennsylvania, have invented a new and useful Improvement in the Construction of Forks; and I declare the following to be a full and exact description of the same, reference being had to the annexed drawings, making a part of this specification, in which—

Figure 1:
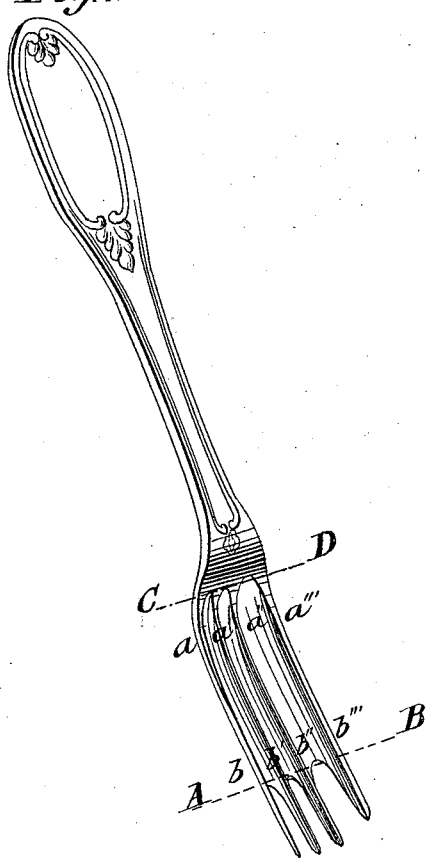
Figure 2:
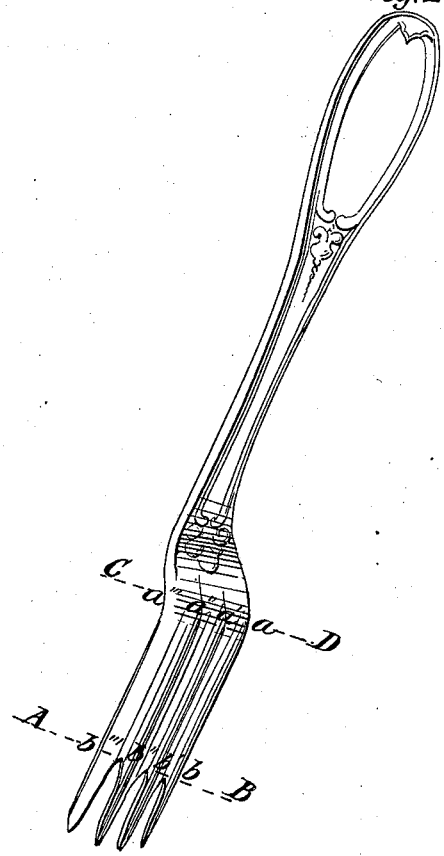

Figure 1 is a front view of a dining fork constructed on the plan of my improvement. Fig. 2, is a back view of the same.

My improvement consists in constructing the ordinary fork so that the interstices of a portion of the fork between the tines shall be filled up by a metallic surface or web. By such a fork many articles of food can be more conveniently eaten than with the spoon which is now required, at the same time the tines of the fork can be made smaller and the whole fork rendered lighter without diminishing its strength.

I construct my improved fork of any metal whatever and conform it to the general form and size of the ordinary forks in use, as is shown in the accompanying drawings. Between the lines A, B, and C, D, the interstices of the tines are filled up by metal slightly thinner than the tine. The lower part of the tines below the line A, B, is constructed in the ordinary manner as is also the part above C, D. The fork may be either cast so as to assume this shape or may be rolled or hammered in the ordinary way. I have found by trial that forks so made require less metal and are equally strong and far more convenient than common forks. It is probable that the tines of large agricultural forks so constructed could be used under some circumstances with great advantage.

What I claim and desire to secure by Letters Patent as my invention is—

The construction of forks with a metallic web or sheets, between a part of the prongs as above described.

SHERBURNE BLODGETT.

Witnesses:
 I. E. SHAW,
 J. H. B. JENKINS.